United States Patent [11] 3,569,948

[72] Inventor Kermit A. Norris
Azusa, Calif.
[21] Appl. No. 662,639
[22] Filed Aug. 23, 1967
[45] Patented Mar. 9, 1971
[73] Assignee Subscription Television, Inc.
New York, N.Y.

[54] HIGH BIT DENSITY RECORD AND REPRODUCE SYSTEM WITH SELECTED FREQUENCY BAND COMPONENT DISPERSAL

15 Claims, 5 Drawing Figs.

[52] U.S. Cl. .......... 340/174.1
[51] Int. Cl. .......... G11b 5/02, G11b 5/44
[50] Field of Search .......... 340/174.1 (G), 174.1 (H), 174.1 (B); 179/100.2 (K), 15.55, 100.2 (MI); 346/74 (M)

[56] References Cited

UNITED STATES PATENTS

| | | | |
|---|---|---|---|
| 3,412,214 | 11/1968 | Gabor | 340/174.1 |
| 2,539,556 | 1/1951 | Steinberg | 179/100.2 |
| 3,371,157 | 2/1968 | Bushway | 179/100.2 |

OTHER REFERENCES

Hopner, E., " COMMUNICATION SYSTEM," IBM Tech. Disc. Bull. Vol. 9 No. 1, June 1966, pp. 29— 30.

*Primary Examiner*—James W. Moffitt
*Assistant Examiner*—Vincent P. Canney
*Attorney*—Jackson & Jones

ABSTRACT: A method and apparatus is disclosed which avoids bit dropout and dropin problems associated in magnetic medium recording by resolving the random multilevel signal inputs characteristic of digital data into a plurality of selected frequency band components. These selected frequency band components are each subjected to a different time delay which relative time delays are selected at random. A signal summation circuit sums the delayed frequency band components and the summation signal is recorded in assigned spaces on a single data track on a magnetic medium as a slowly varying nonsaturable analog signal. This method and apparatus as disclosed thus disperses in a single data track the information content of several data bits over a considerable length of the magnetic medium rather than confining them to sequential bit cell intervals. Accordingly, any spurious signal variation for a short duration of time, as normally characterized by a dropout or a dropin, results in a loss of only a few frequency cycles of several frequency band components which compose the information content of many data bits with the result being that extremely high bit rates are possible with virtually no probability of a bit dropout or a bit dropin. Reproduction of the binary data is accomplished through the use of a complementary frequency band dispersive circuit. In a further nonlimiting embodiment wherein the magnetic medium may vary in speed relative to the record and reproduce circuits, an intermediate record and reproduce device is employed which is responsive to such speed variations so as to continually assure precise spatial separation of the frequency band components on the magnetic medium.

Patented March 9, 1971 3,569,948

3 Sheets-Sheet 1

INVENTOR.
KERMIT A. NORRIS
BY Christie, Parker & Hale
ATTORNEYS

INVENTOR.
KERMIT A. NORRIS
BY Christie, Parker & Hale
ATTORNEYS.

INVENTOR.
KERMIT A. NORRIS
BY Christie, Parker & Hale
ATTORNEYS.

HIGH BIT DENSITY RECORD AND REPRODUCE SYSTEM WITH SELECTED FREQUENCY BAND COMPONENT DISPERSAL

CROSS REFERENCE TO RELATED APPLICATIONS

This invention although useful with any digital data record and reproduce system is particularly applicable to the extremely high bit rates provided by the method and apparatus of the copending patent application filed Nov. 7, 1966 Ser. No. 592,458, which is assigned to the same assignee as the present invention now U.S. Pat. No. 3,518,648.

BACKGROUND OF THE INVENTION

1. Field of the Invention

The field of this invention is primarily related to data handling apparatus employing magnetic storage media. In particular, the application of this invention results in extremely high bit rates which are characteristic of high-speed data handling fields such as satellite instrumentation wherein a very short period of time exists for recovery of a great quantity of stored data. Today's computer industry is continually seeking higher bit rates for all computer uses, and such high-speed equipment is also another exemplitive field of this invention.

2. Description of the Prior Art

Numerous techniques for handling digital data are today standard in the art. In particular, binary data wherein a "1" is distinguished from an "O" by a uniquely timed difference in signal levels relative to successive bit cell periods is a common technique employed in data handling systems. In the introduction to the above mentioned related patent application, two distinct approaches for timing the reading and writing of digital data are discussed in detail as typical of the prior art and reference may be made thereto for such details. Briefly, however, these two approaches involve either a recorded clock or a derived clock approach wherein every bit cell period is established as a timing reference so that signals stored on a track on a magnetic surface can be analyzed for their information content at precise bit cell times. Often the prior art utilizes a flux saturation on the magnetic medium so as to indicate a particular binary condition. In the above mentioned related patent application, techniques are taught which for the first time eliminate any necessity for reliance on a recorded or derived clock technique and instead utilizes a data modulated carrier signal so as to store binary data on a magnetic surface in a phase-modulated nonsaturating analogue signal. This new recording and reproducing technique of the related application results in bit densities as high as 10 and 20 thousand bits per inch per track with error rates significantly less than any known prior art approach.

I have discovered that when information is recorded on the magnetic medium sequentially on a bit-by-bit prior art basis, particularly at such high bit densities as mentioned above, bit dropouts and bit dropins occur with sufficient duration and frequency that prior to the advent of this invention, error rates required by today's increasingly high bit density technology may not be obtained.

Regardless of the digital coding format employed in the prior art, each bit of data heretofore has been represented by signal levels or pulse appearances which are applied to a magnetic recording head with sufficient amplitude to cause flux saturations or variations on a magnetic recording medium. A flux saturation is normally referred to as the "bit recording level" that occurs when a further increase in signal current to the magnetic recording head cannot appreciably increase the signal level recovered for that bit upon playback. At high bit densities, the magnetic medium cannot transgress the complete excursions from one saturation state to the other with the result being that bit-by-bit identity is lost. Furthermore, at high densities eddy current losses and fringe field effects have been noted at the areas of the magnetic surface medium where bits are stored. These adverse effects, coupled with the failure of electronic read and write circuitry to respond instantaneously, result in a severe limitation on the maximum bit densities that prior art recording may achieve.

In any magnetic medium there are numerous surface imperfections resulting from air bubbles, foreign matter and even the binder for the magnetic oxide coating material itself. Dents and surface abrasions together with pin holes in the magnetic coating tend to act as microscopic dust particles that momentarily separate the magnetic surface from the read or write head. These imperfections result in momentary yet significant losses of signal levels which are much lower than the operating levels for detection circuitry and thus cause bit dropouts. Another cause of error which I have discovered results from static electricity discharges and other impulsive circuit noise which occur at random intervals under conditions of high bit density recording. These discharge and impulsive noise conditions are often erroneously interpreted by the detection circuitry as a bit and thus, are referred to as bit dropins. Such bit dropins have not received as much attention as dropouts mainly because of the low bit densities which have been used prior to the advent of this invention. At low bit densities, of course, such impulse noise is normally of insufficient duration to cause an error in the detection scheme. High bit densities, however, are not immune to dropins and thus the techniques of this invention which avoids such problems are mandatory.

The techniques employed in the prior art for avoiding the dropouts and dropins are basically problem avoidance techniques and do not suggest a remedy for the problem. For example, one prior art method detects permanent surface imperfections of the magnetic medium through a costly microscopic analysis of the magnetic surface. Once permanent imperfections in the medium have been discovered, warnings are written on the medium and electronic circuitry is provided which responds to these warnings so as to circumvent the damaged portion of the magnetic medium. This method adds costly and sensitive equipment to the system and furthermore does not provide any protection against random particles or random impulse noise from sources other than the medium and thus, is not a satisfactory approach for high bit density recording. A second prior art approach uses special error correcting codes based normally upon lateral parity, longitudinal parity, or both. A normal outgrowth of this second method is to use a redundant scheme so that if the parity checks do not balance out, electronic circuitry can detect, locate and correct for the error by using the redundant data from the magnetic record or other storage device. This second prior art approach is again costly and introduces sensitive electronics and, furthermore, the required redundancy increases the amount of data storage which is necessary. Further, the very fact that longitudinal and lateral parity must be recorded, reduces the amount of area available for information content by the number of extra checking bits which must be stored, and otherwise increases the complexity of the data format.

SUMMARY OF THE INVENTION

The above disadvantages of the prior art are avoided in accordance with my invention wherein the problems of dropouts and dropins are remedied rather than avoided.

Bit dropouts and dropins, in accordance with the principles of my invention, are characterized as impulse noise which may be represented over a recording interval as a large number of independent random variables. The well-known Central Limit Theorem states essentially that the sum of large numbers of random variables, approaches a gaussian distribution as the number of independent random variables (i.e., dropouts and dropins) increases regardless of the initial distribution of these independent variables. Based upon this approach I resolve the time domain information content into a frequency domain, which frequency domain is recorded on the magnetic storage medium. Dropout and dropin noise, regardless of its point of origin, is also resolved into a frequency domain and thus tends to approach a gaussian distribution. Thus, the information content is deliberately dispersed and impulse noise is effectively integrated in time and combined with the information content. This dispersive technique is accomplished by frequency smearing. For example, the bandwidth of the recording system is divided into a plurality of frequency ranges by frequency selective band-pass filters. A group of random time delays are connected to the filter outputs and the outputs of the time delays are summed prior to their application to a recording head positioned adjacent to a magnetic storage medium. A series bit train of information is applied in common to all filters. Accordingly, the data is stored on the magnetic surface in the form of frequency band components which each appear at different times spatially oriented along a single data track on the magnetic surface. In a similar manner any impulse noise from sources other than the heads and the magnetic medium, is spread out spatially along the magnetic surface. Any impulse noise resulting from heads and magnetic surface imperfections affects, at most, only a few cycles of the several frequency components which represent many information bits being recorded at the particular imperfection spot on the magnetic medium. Accordingly, there is no loss of a single or multiple number of bits which is characteristic of the prior sequential bit storage in magnetic areas corresponding to the associated bit cell period.

BRIEF DESCRIPTION OF THE DRAWING

The foregoing the other features of my invention may more readily be understood by reference to the accompanying drawings in which.

DESCRIPTION OF THE PREFERRED EMBODIMENT

Figure 1:
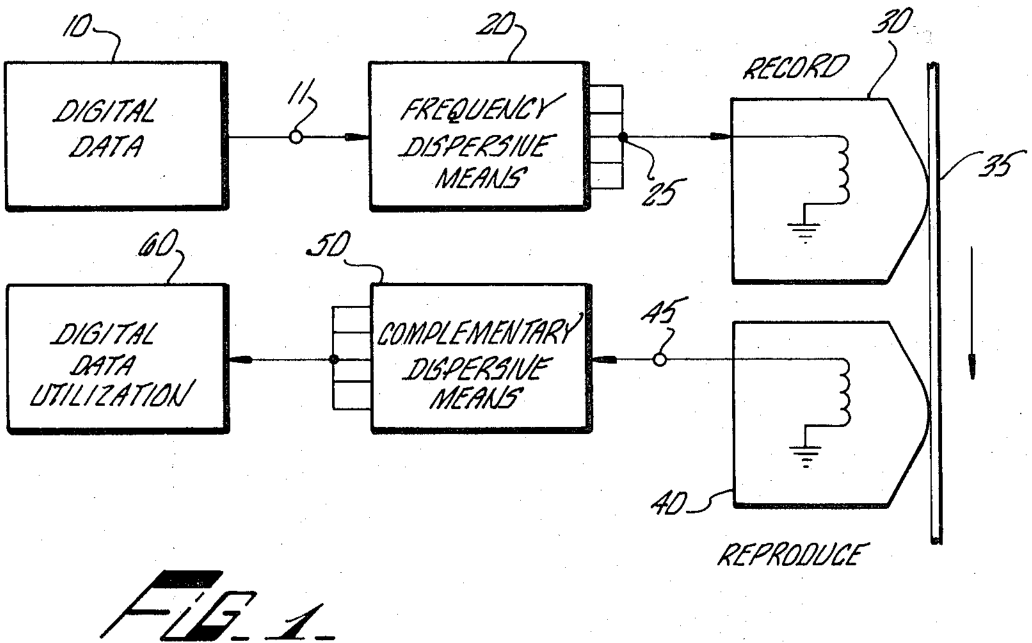
FIG. 1 is a block diagram record and reproduce system employing a frequency dispersive and complementary frequency dispersive technique.

Turning now with reference to FIG. 1, a source of digital data 10 is shown connected to a frequency dispersive means 20 in the record channel. This source of digital data 10 may be any high bit rate source which employs any typical NRZ or RZ formats for coding digital data. As one typical example, the digital data source 10 may include the split-phase-mark (S M) format described in the foregoing related patent application, although it is by no means limited thereto. The frequency dispersive means 20 separates the various frequencies present in a sequential bit train of incoming binary bit data. The frequency content, of course, varies depending upon the information content in a manner more fully described hereinafter.

As a typical nonlimiting example, assume that the bandwidth of the magnetic recording system has an upper cutoff frequency of approximately 10,000 cycles per second. The frequency dispersive means 20 may include five frequency selective filters which divide this bandwidth into five frequency components such as, for example, 0 to 2,000 C.P.S.; 2,000 to 4,000 C.P.S.; 4,000 to 6,000 C.P.S.; 6,000 to 8,000 C.P.S.; and 8,000 to 10,000 C.P.S. These frequency band components are each subjected to different and random time delay amounts as provided by the filter characteristics or by separate delay elements prior to their summation at summing point 25. The summed signal at 25 is applied to any suitable magnetic recording head 30 positioned adjacent to, and adapted for relative movement with respect to, any suitable magnetic recording medium 35 such as a magnetic recording tape, drum or disc, to list some typical examples.

It is, of course, well known that any waveform such as a sequential train of bits characterized by a multilevel format, can be resolved as the sum of a family of sinusoidal waves of different frequencies by the well-known Fourier Series analysis. In fact, Fourier Integrals have become standard tools for the analysis of a series of randomly spaced recurrent pulses. Both the Fourier Series and the Fourier Integrals as they apply to such pulse patterns are considered in some detail in Chapter 14, Pages 403—468 of the book entitled "Electrical Engineering Circuits" by Hugh H. Skilling published by John Wiley & Sons, Inc. Reference to the foregoing chapter may be had if a more detail analysis is required. Basically, however, any one of the various data formats used in digital work today may be analyzed into a series of substantially sinusoidal waves each having a different frequency. Thus, the binary data supplied by source 10 will be resolved into frequency components, some of which may fall in the low frequency band and be delayed a first given amount by the frequency dispersive means 20 prior to being summed with other frequency components for recording by the recording head 30. Frequency components of incoming data falling within the second frequency band are delayed a second different time amount and are also summed with other components for recording. The time delay difference for these two frequency bands results in a different physical location on the magnetic medium in that the summed second frequency band is spaced a given amount from the first. All remaining frequencies are resolved into their respective frequency bands and are summed for recording on the magnetic medium at different spatial positions according to differences in time delay amounts. It should be understood, however, that all of the components which make up the information content, share the same track as a composite frequency domain signal on the magnetic medium.

By definition for purposes of this patent application, the bit-by-bit sequential appearance of binary data is considered as occupying a time domain because it is generally recorded in time-dependent fashion by prior art recording techniques. Thus, in time domain recording several side-by-side bits presented to a record head are stored sequentially in associated serially spaced bit cell areas of one track on the magnetic medium. In accordance with the principles of this invention, however, binary data is converted from its time domain to a frequency domain and is recorded on the magnetic medium in such a frequency domain. Thereafter, upon reproduction a magnetic read head 40 recovers the combined signal summed from the various delayed frequency band components as recorded on the magnetic medium 35. The combined signal recovered by the head 40 is applied to a complementary dispersive means 50. The term complementary is employed to describe the dispersive means 50 in that it is matched in all essentials to the frequency dispersive means 20 except that the delay times for the frequency band components are functionally opposite to that in the frequency dispersive means 20. A summing junction 55 recombines the various frequency band components after they have been passed through the complementary dispersive means 50 and at the summing junction 55, the train is reestablished in its original format. A digital data utilization circuit 60, such as a computer, is connected to the summing junction 55 and is adapted to employ the digital coding format for any desired purpose.

Figure 2:
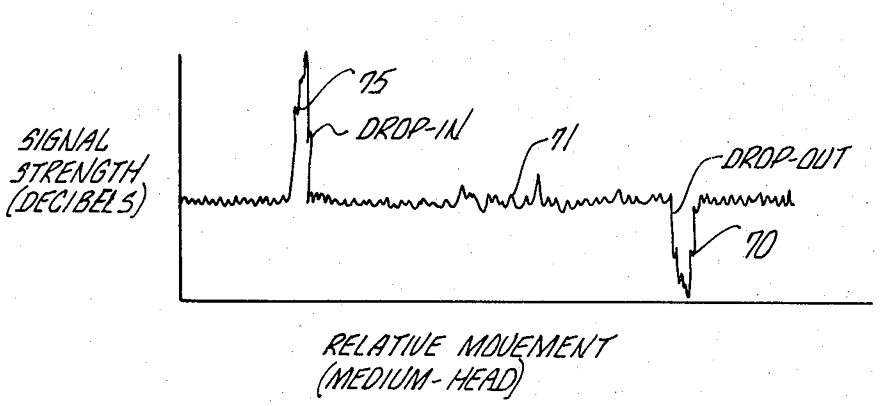
FIG. 2 is a wave form showing signal variations representative of dropouts and dropins.

Reference to FIG. 2 depicts a waveform which is particularly useful in demonstrating the correlation that I have discovered between dropouts and dropins for a magnetic medium system as compared, for example, with impulse noise in standard communication theory.

It is well known that signal loss expressed in decibels for magnetic recording systems is defined by the following expression: SIGNAL LOSS = 54 $d/\lambda$ ; wherein $d$ is the amount of separation experienced by the magnetic medium and the record or reproduce head; and λ is the bit cell duration at a given packing density.

A more meaningful expression may be obtained by assuming that the packing density is 10,000 bits per inch per track which means that each bit cell period is 100 microinches in length. Particles of dust, misaligned magnetic material, surface imperfections, binder, etc. depending upon the quality of the magnetic medium have been known to separate the head and tape by amounts of approximately 50 microinches. In such an instance, the signal loss would be 27 decibels. Thus, if it is assumed with reference to FIG. 2 that the normal signal strength 71 received by the reproduce head 40 is in the order of 30 or 35 decibels, then a separation resulting from surface imperfections of the magnitude just described would result in a recovered signal of only three to eight decibels during the duration of the imperfection. This condition is properly termed a dropout since conventional detection circuitry fails to operate satisfactorily at such low signal strengths and bits at this area are missed or dropped. The noise causing such a dropout is depicted, for example, by the noise waveform 70 in FIG. 2. It is readily apparent that such a dropout 70, which may persist for a period of five to six hundred microinches, results in the loss of five or six bits if such bits have been stored in accordance with the sequential time domain commonly employed in the prior art prior to the advent of this invention.

In a similar manner, impulse noise such as that introduced by associated electronic equipment, static discharge or by any other exterior electrical disturbances, suddenly increases the signal strength by an amount shown by the impulse noise wave 75 in FIG. 2. Again by reference to normal time domain prior art approaches, such a disturbance is referred to as a dropin in that it may be interpreted by the detection equipment as the presence of several bits of one binary value when, in fact, no bits of that value were present at those time intervals in the original information content stored at that area on the magnetic medium. It is, of course, impossible to completely eliminate noise such as the dropin and dropout waveforms 70 and 75 of FIG. 2 from a magnetic medium system. However, in accordance with my invention the random appearance of such impulse noise can only result in loss or variation of a few cycles of several different frequencies. These affected frequencies, because of the frequency smearing of the data, represent only a small portion of several different binary bits as dispersed by the frequency dispersive means of my invention. Accordingly, the signal derogation of a dropout or dropin does not in any way result in a total loss of any particular binary bit. In fact, I have experienced that such impulse noise of the nature normally experienced with magnetic medium systems is negligible and error rates, at extremely high density, of less than one in $10^{10}$ have been provided by my invention.

Figure 3:
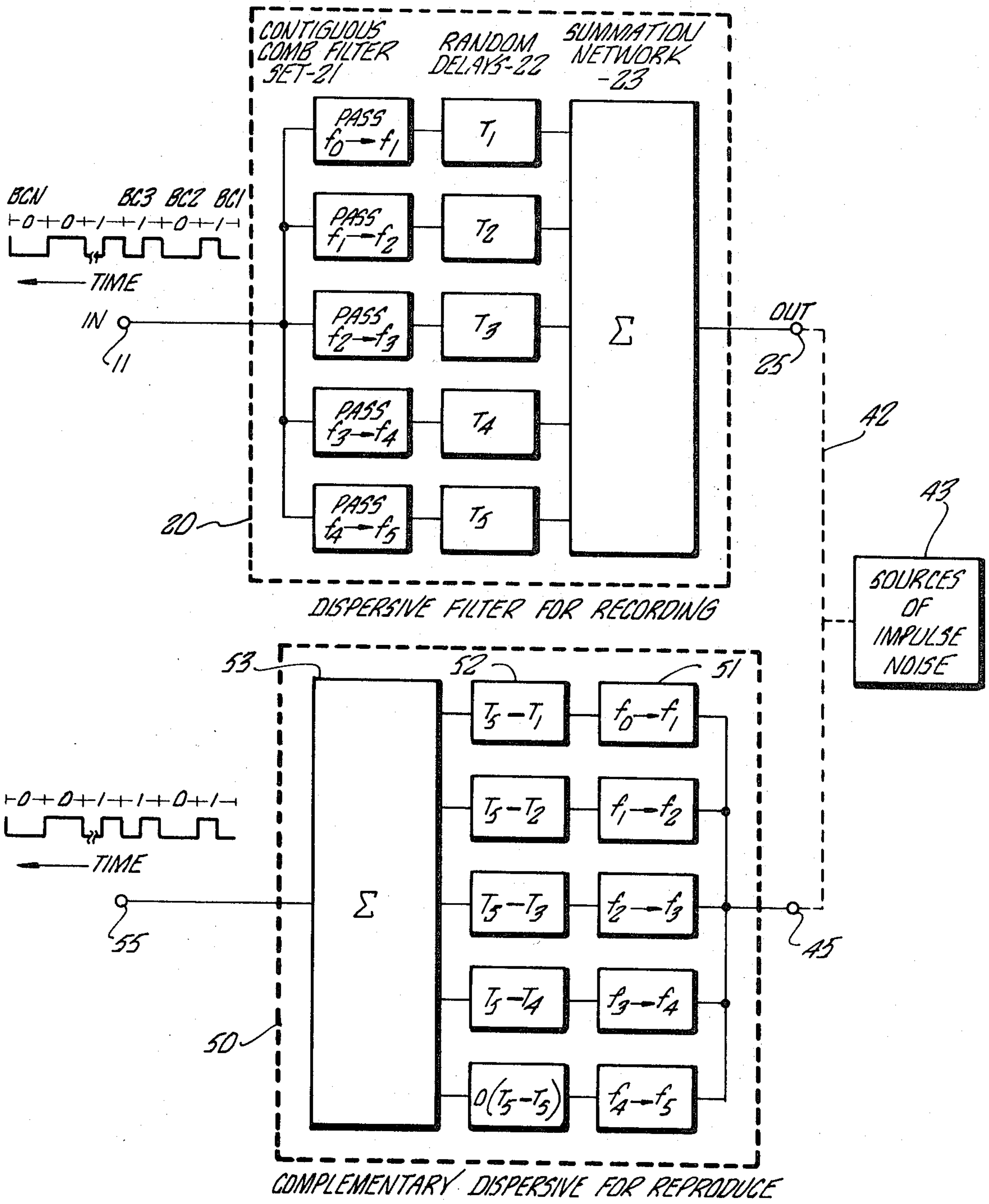
FIG. 3 is a block diagram of one particular type of frequency dispersive and complementary frequency dispersive circuits suitable for employment in FIG. 1.

Reference to FIG. 3 discloses one possible embodiment of a frequency dispersive circuit 20 and complementary dispersive circuit 50 which are satisfactory for my invention. In FIG. 3, the frequency dispersive circuit 20 comprises a contiguous comb filter set 21 which is depicted, for purposes of example, as having five separate selective pass-band filters. One selected code format, referred to as S M, is shown as typical of the type of data input supplied to the dispersive filter 20. In such a format a transition from one signal level to another signal level always occurs at the beginning of every bit cell period with a "1" represented by an additional level transition which occurs at midbit time of a cell period and an "0" is represented by the absence of any midbit transition. It should be understood that bit cell interval BC1 is only the first one of a considerable number of binary bits from an information containing train present at input terminal 11. This first bit of BC1 will be resolved by the contiguous comb filter set 21 into five different frequency bands of the ranges indicated generally as $f_0$—$f_1$, through $f_4$—$f_5$. Furthermore, the signal output from each of the individual filters of set 21 will assume a waveform which is dependent not only upon the first binary bit in binary cell BC1 but also based upon all subsequent bits appearing in the other binary cell periods BC1 through BCN.

Accordingly, for purposes of visualization, it may be assumed that the pass filter of set 21 having a pass range $f_0$—$f_1$ emits a slowly varying analogue wave which is representative of the frequencies of the train of binary data inputs up to the upper cutoff frequency $f_1$. In a similar manner, the other pass filters of set 21 emit similar waveforms having different frequencies within their associated frequency bands. At this point in the circuit operation, the various frequency components of the binary data input train have been resolved by the filter set 21. A plurality of delay circuits 22, having one delay each connected in tandem to the selective filter circuits of set 21, introduce a different delay to each one of the selected frequency components. The delay times for the delays 22 are not critical and, in fact, may be selected at random provided that each delay is different from the other delays so as to produce a beneficial frequency smeared output signal.

Each one of the frequency band components after it has been delayed at random relative to the other frequency band components by delays 22, is applied to a summation network 23 which may be of any suitable type such as a resistive summation network. This summation network 23 recombines the delayed frequency band components into a single composite output signal which is representative of the binary data and is an analogue signal. This analogue signal at output terminal 25 represents the binary data as expressed in a frequency domain in which all of the frequency band components for individual bits that are dispersed by the random delays. Record head 30 records the composite analogue output signal on one track of the magnetic medium.

FIG. 3 also depicts the complementary dispersive circuit 50 which is necessary to reassemble the frequency smeared components into the original coded binary data format. The magnetic medium 35, the record and reproduce heads 30 and 40 and other electronic components, as well as exterior noise sources are depicted in symbolic fashion by the dashed lines 42 and the symbolic noise source 43. As mentioned hereinbefore in connection with FIG. 2, these and other components tend to create dropout and dropin noise signals which tend to derogate the signal recorded on the magnetic medium. However, such derogation affects only a few particular signals of various frequency band components which in their frequency domain, represent a great number of bits. Accordingly, the input wave applied to the input terminal 45 of circuit 50 is a composite wave which not only represents the binary data content, but also represents the various spurious frequencies of the dropouts and dropins whether those frequencies are additive or subtractive with respect to the composite frequency domain information signal on the magnetic medium.

Upon recovery, this combined data and noise waveform is applied to a contiguous comb filter set 51 which is precisely matched in characteristics to the filter set 21 of circuit 20. Accordingly, the frequency domain waveform is again separated into its various frequency components and is applied to a set of delay circuits 52 which have one delay each connected in tandem to an associated filter of the set 51. The delay times for the delay circuits 52 complement exactly those of the random delays 22 of circuit 20. Thus, in the example depicted in FIG. 3, the pass filter in circuit 20 with the frequency band $f_4$—$f_5$ is arbitrarily subjected to the longest delay of an amount $T_5$. This longest delay in the reproduce operation is "0" (i.e., $T_5$ minus $T_5$) and in a similar manner each of the remaining delays for the other frequency components are a complementary amount such as $T_5$ minus $T_4$ for the frequency range $f_3$—$f_4$. This complementary set of delays 52 thus reorganizes the various frequency components and presents them to the summation network 53 in the precise time relationship that they possessed originally. Summation network 53 recombines these frequency components into the S M waveform as originally supplied by the digital data source 10 and presents it at output terminal 55 for delivery to a utilization circuit 60.

Figure 4:
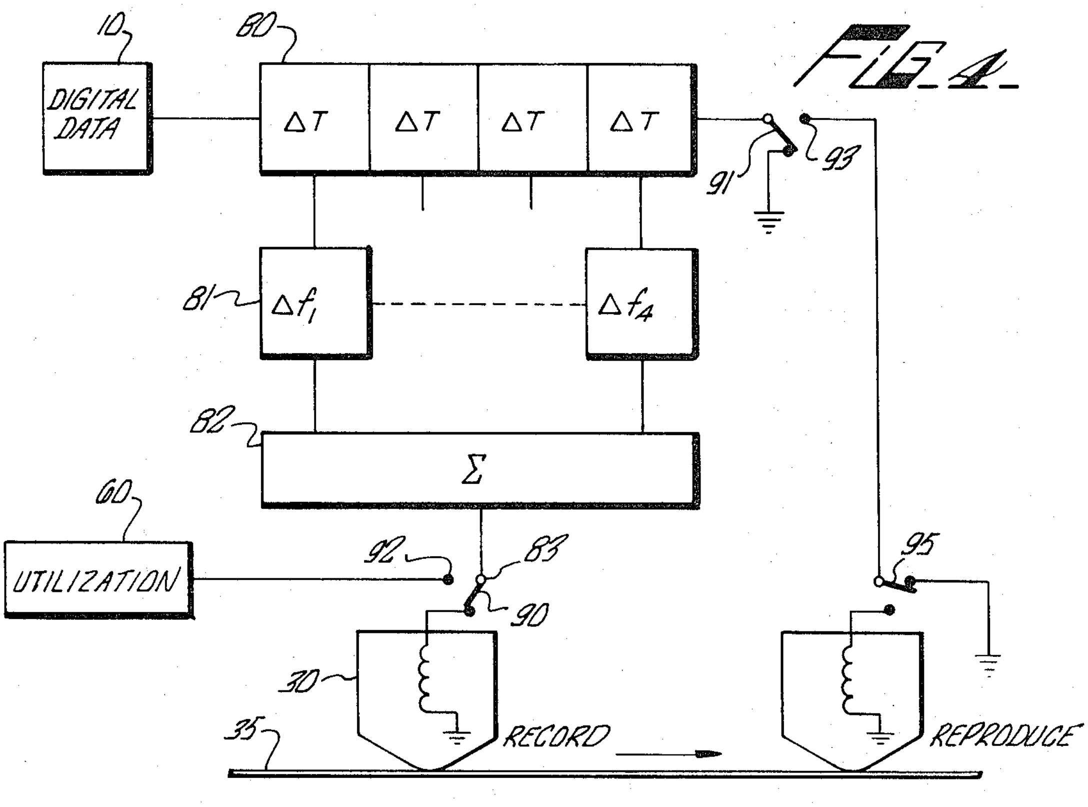
FIG. 4 is a block diagram of an alternate frequency dispersing circuit which may be employed in conjunction with FIG. 1.

An alternative embodiment for achieving the dispersive and complementary dispersive smearing in accordance with this invention is depicted in FIG. 4. A source of digital data 10 again applies a binary coded format with each bit sequentially following the others to a tapped delay line 80 of any well-known type. The delay line 80 is separated into equal tapped delay amounts delta T as indicated. A set of pass-band filters 81, having one each for each of the tapped delay outputs, is connected to the delay taps of delay line 80. These filters 81 again pass selected frequencies and apply them to a summation network 82 which has its output 83, during a write operation, connected to a write head 30.

As shown in FIG. 4 the same delay line 80, filter set 81 and summation circuit 82 may be used for alternate read and write operations depending upon a particular system requirement. Thus, during a write operation switch 90 which may be any suitable switch such as a relay or selectively controllable electronic gate, is connected to the write head 30 so that the frequency domain of the data supplied by source 10 is written on the magnetic medium 35 in the manner described hereinbefore. Switch 91 during a write operation is connected to a reference potential such as ground which acts as a data sink for the data once it has passed through delay line 80. Switches 90 and 91 during a read operation would be closed at the upper terminals 92 and 93 respectively, and switch 95 would be closed to the output terminal of reproduce head 40. Thus, during recovery, the composite signal including the frequency smeared data and noise components is automatically delayed by complementary amounts with respect to the frequencies assigned to the filter set 81. The frequency domain is thus separated into its frequency components and is reestablished as a time domain signal present at the output 83 for its application to a utilization circuit 60.

It is of prime importance for the proper operation of my invention to have a constant speed of the magnetic medium relative to the record and reproduce heads so that the various frequency band components assume a constant spatial displacement relative to each other on the magnetic medium. In the description of my invention so far it has been assumed that the magnetic medium has moved relative to the record and reproduce heads at a constant speed. This assumption is, in fact, a valid assumption for some computer systems such as computer systems employing magnetic disc files or drums as the magnetic media inasmuch as various electronic tachometers and speed regulation circuits available today assure a constant rotational speed for such discs and drums. In those instances, however, where the recording medium is not moving at a constant speed, relative to the heads (or vice versa) as, for example, in some magnetic tape transport systems, means must be provided for establishing variable delays.

The variable delay amounts must vary inversely with the head-to-medium speed variations. Variable delay circuits, of course, are available on the market, and such delay circuits are satisfactory. However, at present, such variable delay circuits are relatively costly devices. A more economic and simpler technique for achieving a constant spatial displacement for the various frequency band components is represented in schematic and block diagram form in FIG. 5.

Figure 5:
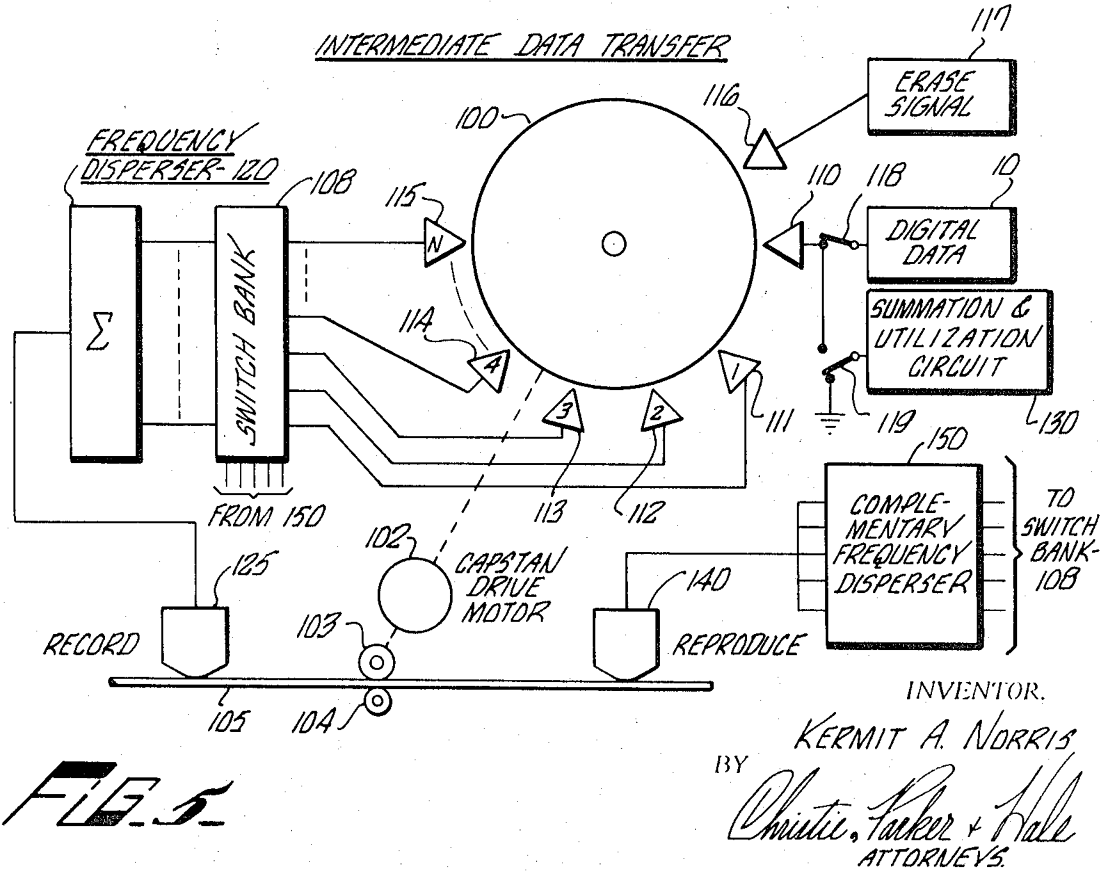
FIG. 5 is a combined schematic and block diagram depicting an intermediate data transfer technique useful for achieving spatial uniformity for the frequency domains when recorded on a magnetic recording medium which experiences random speed variations.

In FIG. 5 a magnetic data transfer disc, or drum, 100 is provided. This transfer device 100 is mechanically driven by the same capstan drive motor 102 which, in any well-known manner, also drives the magnetic tapes 105 through a pickup assembly of any well-known form. For example, one typical tape pickup assembly is represented as a driven capstan 103 having a pinch roller 104 for seizing the magnetic tape 105. Any speed variations in the magnetic tape 105 which is being driven, is simultaneously present as a rotational speed variation in data transfer device 100.

During a data storage operation digital data source 10 through closed switch 109 applies binary coded data to a magnetic surface of drum 100 through any read-write head 110 which is selectively placeable in a read or a write mode as is well known. A plurality of such magnetic read-write heads 111 through 115 are spaced at predetermined radial locations along a single data track on transfer device 100. Each of these heads 111 through 115 are set in a read mode and are connected through a switch bank 108 to a frequency dispersive circuit 20 which may be any of the types discussed hereinbefore in conjunction with FIGS. 1, 3 and 4. An erase head 116 and a source of erase signals 117 is utilized during a recording operation so as to clear transfer device 100 for new information as supplied by write head 110. The output from the frequency dispersive unit 120 is applied to a record head 125 for storing the input data in its frequency domain on tape 105.

A consideration of the function of the data transfer device 100 discloses that it is, in operative effect, a tapped delay line similar to that discussed in conjunction with FIG. 4 because the spacing of the read heads 111 through 115 and the amount of rotational velocity determines the amount of delay which is provided to data stored on drum 100 by write head 110. Furthermore, the drum 100 functions as a variable delay in that as the capstan drive motor 102 tends to vary in speed, a correspondingly inverse speed variation takes place in drum 100 in order to assure a precise spatial alignment of each frequency band component as it is recorded by head 125 on tape 105.

Only a data recording operation has been described since the operation for reproduce is again a complementary frequency dispersive operation similar to that which has already been fully described in conjunction with FIG. 4 and which need not be repeated here. Briefly, switch bank 108 connects to outputs of complementary frequency disperser 150 to record heads 111 through 115 which are positioned relative to read head 110 so as to provide a complementary delay to the various frequency band components. During recovery the switch positions for switches 118 and 119 are reversed and read head 110 applies the complementary delayed frequency band components through closed switch 119 to a summation and utilization circuit 130 of the types described hereinbefore.

As one alternative in FIG. 5, head 110 and heads 111 through 115 may be capable of only write and read, respectively. An additional group of heads may then be positioned in precise alignment with head 110 and heads 111 through 115 so as to share a second data track on drum 100 and be of the write and read only type respectively.

It is to be understood that the foregoing features and principles of my invention are merely descriptive, and that many departures and variations thereof are possible by those skilled in the art, without departing from the spirit and scope of my invention.

I claim:

1. Apparatus for reducing recording errors for a sequential train of information-representing binary data having a bit cell period which is substantially equal to or less than the duration of spurious electrical noise signals and the duration of surface imperfections on a magnetic storage medium adapted for relative movement adjacent a magnetic recording head, said apparatus comprising:

means for receiving an input train of binary data and deriving therefrom a plurality of frequency band components which together constitute the binary data input train;

a plurality of delay means, one each for each one of the plurality of frequency band components, said delay means adapted to delay each frequency band component by an arbitrary amount independent of and distinct from the amount of delay for all other frequency band components;

a magnetic recording head adapted to record an analogue signal on a single track of said magnetic storage medium; and a signal summation circuit having an input connected in common to said delay means and an output for applying a composite analogue signal to said magnetic record head.

2. Apparatus in accordance with claim 1 wherein said input train receiving means comprises:

an input terminal for receiving said data input train;

a plurality of selective band-pass filters each having a filter input connected in common with the other filter inputs and also connected in common to said input terminal; and a filter output individually connecting each filter to one of said plurality of delay means for providing said independent and distinct delay times to signals passed through each one of said plurality of filters.

3. Apparatus for reducing recording errors for a sequential train of information-representing binary data having a bit cell period which is substantially equal to or less than the duration of spurious electrical noise signals and the duration of surface imperfections on a magnetic storage medium, said apparatus comprising:

input means for receiving train of binary data;

driving means connected to said input means for deriving from said data train a plurality of frequency band signals each of which is displaced in time an arbitrarily chosen distinct amount from the other frequency band signals and all of which together in nondisplaced order constitute the binary data input train; and recording means connected to said deriving means for recording a composite signal formed from said displaced signals on a magnetic storage medium.

4. Apparatus for reproducing data recorded in accordance with claim 3 wherein said reproducing apparatus comprises:

means for recovering said composite signal from said magnetic storage medium; and means connected to said recovery means for rederiving said plurality of frequency band components in nondisplaced order to constitute said original binary data input train.

5. Apparatus in accordance with claim 4 wherein said rederiving means comprises a plurality of pass band filters each having pass band characteristics matched to coincide with the pass bands of said deriving means.

6. Apparatus in accordance with claim 5 wherein said rederiving means further comprises a plurality of delay means each having delay times which complement the displacement times of said deriving means, with each complement delay time being associated with one filter having a pass band matched to the frequency band signal which received a displacement time complementary thereto in said deriving means.

7. Apparatus in accordance with claim 3 wherein said frequency band signal deriving means comprises:

a delay line connected to said input means, said delay line having tapped outputs at predetermined delay increments;

a plurality of selective band-pass filters one each connected to a tapped output of said delay and each filter having a pass band distinct from the pass band of the other filters of the plurality.

8. Apparatus in accordance with claim 7 wherein said plurality of filters is characterized in that all of the frequency bands are contiguous over the bandwidth of the magnetic recording apparatus.

9. Apparatus in accordance with claim 7 wherein said recording means comprises:

a signal summation circuit connected in common to said plurality of filters for forming said composite signal; and a magnetic recording head positioned adjacent said magnetic storage medium and experiencing relative movement therewith to record the composite signal as a nonsaturating signal on a single information track.

10. Apparatus in accordance with claim 9 wherein the relative movement between the recording head and the magnetic storage medium is of randomly variable speeds; and wherein said delay means is variable by a factor related to said speed variations which establishes a constant spatial separation for each frequency band's contribution to said composite analogue signal as recorded on said single information track.

11. Apparatus in accordance with claim 10 wherein said delay comprises an intermediate magnetic data storage device coupled to said input means through a second magnetic recording head, and wherein said tapped outputs of said delay comprises a plurality of magnetic reproduce heads spaced apart at equal intervals and operatively coupled to said intermediate storage device to reproduce input data recorded thereon by said second recording head at equal time delay intervals for a constant relative speed between the storage device and said plurality of reproduce heads.

12. Apparatus in accordance with claim 11 wherein said intermediate magnetic storage device comprises a drum.

13. Apparatus in accordance with claim 11 wherein said intermediate magnetic storage device comprises a disc.

14. Apparatus in accordance with claim 11 wherein said intermediate magnetic storage device is rotatable past said plurality of reproduce heads; and said magnetic storage medium comprises a magnetic tape;

said apparatus further comprising:

a driving means for driving said tape past said first-claimed magnetic recording head at a speed which is randomly variable; and means operatively coupling said driving means to said intermediate magnetic storage device for varying its rotatable speed synchronously with said variable driving speeds for said magnetic tape.

15. Apparatus in accordance with claim 14 wherein the variations in rotational speed of said intermediate magnetic storage device result in inverse variations in said time delay intervals.